US008139345B2

(12) United States Patent
Christensen et al.

(10) Patent No.: US 8,139,345 B2
(45) Date of Patent: Mar. 20, 2012

(54) MOTOR OPERATOR FOR SWITCHGEAR FOR MAINS POWER DISTRIBUTION SYSTEMS

(75) Inventors: Bruno Christensen, Nordborg (DK); Anders Lorenzen, Åbenrå (DK); Verner Smidt, Broager (DK); Jens N. Paulsen, Sønderborg (DK); Glenn Smith, Nottinghamshire (GB)

(73) Assignee: Linak A/S, Nordborg (DK)

( * ) Notice: Subject to any disclaimer, the term of this patent is extended or adjusted under 35 U.S.C. 154(b) by 0 days.

(21) Appl. No.: 12/311,971

(22) PCT Filed: Oct. 31, 2007

(86) PCT No.: PCT/DK2007/000467
§ 371 (c)(1), (2), (4) Date: Apr. 21, 2009

(87) PCT Pub. No.: WO2008/052552
PCT Pub. Date: May 8, 2008

(65) Prior Publication Data

US 2010/0008022 A1 Jan. 14, 2010

(30) Foreign Application Priority Data

Oct. 31, 2006 (DK) ................................ 2006 01403

(51) Int. Cl.
*H02B 5/00* (2006.01)

(52) U.S. Cl. ........ 361/615; 361/605; 361/641; 361/657; 200/17 R; 200/501; 218/154; 307/125

(58) Field of Classification Search .......... 361/600–601, 361/605, 627, 631–632, 641, 643, 647, 615, 361/640, 657
See application file for complete search history.

(56) References Cited

U.S. PATENT DOCUMENTS 4,804,809 A 2/1989 Thompson et al.
(Continued)

FOREIGN PATENT DOCUMENTS

JP 60181427 9/1985
WO 2006106364 10/2006

OTHER PUBLICATIONS

English Abstract of JP60181427.

*Primary Examiner* — Jayprakash N Gandhi
*Assistant Examiner* — Courtney Smith
(74) *Attorney, Agent, or Firm* — Dykema Gossett PLLC

(57) ABSTRACT

A power operator for switchgear (1) for mains power distribution systems, where the switchgear comprises a closed cabinet (5) with an operating shaft protruding there from. The operating shaft is rotable at least between two positions and has a coupling part (2, 3). The operator comprises a housing (10), which is mountable on the external surface (4) of the switchgear housing, and a rotatable connection shaft (14) connected to an electric drive mechanism (11). It has a first coupling part to fit with the coupling part of the operating shaft in a longitudinal axial sliding and non-rotational interlocking manner. The coupling part of the connection shaft (14) is a separate interchangeable part (24, 24*a*) of the connection shaft attached thereto by non-rotational interlocking means. Further, it has an activation knob (16) extending from the housing (10) to operate the switch manually. With an interchangeable coupling part (24, 24*a*) the motor operator could easily be adapted to various switchgear simply by choosing a coupling part (24, 24*a*) fitting the coupling (2, 2*a*, 3) on the switchgear.

4 Claims, 5 Drawing Sheets

U.S. PATENT DOCUMENTS

| | | | | |
|---|---|---|---|---|
| 5,025,171 | A * | 6/1991 | Fanta et al. | 307/150 |
| 5,034,584 | A * | 7/1991 | Fanta et al. | 200/329 |
| 5,284,212 | A | 2/1994 | Huckins et al. | |
| 5,311,161 | A | 5/1994 | Calder et al. | |
| 5,552,647 | A * | 9/1996 | Tinkham | 307/119 |
| 5,895,987 | A * | 4/1999 | Lo et al. | 307/125 |
| 6,181,256 | B1 * | 1/2001 | Fitzsimmons et al. | 340/825.72 |
| 7,053,327 | B2 * | 5/2006 | Benke et al. | 218/154 |

* cited by examiner

MOTOR OPERATOR FOR SWITCHGEAR FOR MAINS POWER DISTRIBUTION SYSTEMS

BACKGROUND OF THE INVENTION

1. Field of the Invention

The invention relates to a motor operator for opening or closing contacts of switchgear adapted for use in mains power distribution systems such as public power distribution. The motor of the operator may be activated either locally or remotely to open or close the contacts of the switchgear. Alternatively, a drive element, normally coupling the motor to the contact operating shaft, is selectively removable so that a wrench-like handle may be used to manually open and close the contacts in case of failure of the motor operator or as a safety precaution.

2. Description of the Prior Art

Underground or pole mounted electrical transmission and distribution systems include a main service line leading from a sub-station with a number of individual distribution lines along the main line connected thereto. It is often the practice, particularly where power is supplied to a user entity such as a discrete residential area, industrial area or shopping area, to provide switchgear in each of the lateral distribution lines connected to the main line in order to allow selective de-energization of the lateral distribution line without the necessity of de-energizing all of the lateral distribution lines. Switchgear conventionally includes electrical, movable contacts which may be opened and closed by maintenance personnel in case of fault in or maintenance of a distribution line. In a particularly useful type of switchgear, the contacts are mounted under oil or in an inert gas atmosphere.

Generally, the contacts of switchgear require snap action opening and closing mechanisms to minimize arcing and assure a positive closing of the contacts. Actuation of the switch operating mechanism has normally been accomplished manually, requiring service personal to locate and travel to the switchgear in question. Recently, there has been increased interest in switch contact actuating mechanisms which are motor operated and can be activated at remote locations as well as manually locally. In some cases, motor operators have been installed within the switchgear cabinet itself for powered actuation of the opening and closing mechanism. By design, these motor operators are not suitable for installation on a retrofit basis on an external side of an existing switchgear cabinet. Moreover, most of the available motor gear operators are relatively expensive, both in terms of cost for various components, as well as expenses for installation of the same. Furthermore, these motor operators do not readily lend themselves to manual actuation in the event of motor failure or in the event that the operator desires to open the switch contacts by hand.

As a consequence of the fact that it is almost impossible to incorporate a motor operator in a switchgear cabinet, there is an increased interest in motor operators that could be mounted externally to the cabinet of the switchgear. In this respect it should be noted that it is not allowed to make any holes in the cabinet or make any weldings, which renders the mounting very difficult. It should also be considered that in most cases the motor operator should not only be weather proof but also secured against unauthorized intrusion. Further, it should be fully operable under all weather conditions and operate in a reliable manner.

An example of a motor operator to be mounted externally on a switch gear is dealt with in U.S. Pat. No. 4,804,809, saidwhich motor operator may even be mounted as a retrofit unit. The motor operator is composed of an assembly of individual elements mounted in a housing, necessitating a tedious dismounting of the connection between the motor operator and the switchgear for manually operating the switchgear.

Further, the motor operator has to be designed for each individual type of switchgear. This renders the motor operator costly.

For connection of the connection shaft of the motor operator to the operation shaft of the switchgear, the connection shaft has a first coupling part to fit with the coupling part of the switchgear in a longitudinal axial sliding and mutually rotational interlocking manner. A problem is that the coupling part of the switchgear differs depending on the various manufactures of switchgear and hence requiring a dedicated construction of the motor operator. In U.S. Pat. No. 4,804,809 the coupling part of the connection shaft is formed of an end of the shaft with a hexagonal cross section. Although not shown, the coupling part of the operation shaft is obviously a socket with a corresponding cross section. Similar in U.S. Pat. No. 5,895,987 the coupling part of the switchgear is an end of the operation shaft, but with a pentagonal cross section and with a key groove in one surface. The coupling part of the connection shaft is likewise a socket with a corresponding cross section. Other geometrical shapes used are square and a rhombus. In U.S. Pat. No. 5,025,171 it is the other way round; the coupling part of the operation shaft being an end of the shaft and the coupling part of the connection shaft being a socket, however, the specific geometry is not given.

Hence, there is a need for a motor operator which overcomes these and other problems associated with known devices.

It is an object of the present invention to provide a motor operator which is easy to mount and can be mounted on switchgear from various manufacturers of switchgear.

According to the invention this is accomplished in that the coupling part of the connection shaft is a separate interchangeable part of the connection shaft attached thereto by non-rotational interlocking means. Thus, it is possible to use one motor operator for switchgear of various brands, simply by choosing the relevant coupling part. It is of no consequence that the motor operator is of the type, which also could be operated manually as the operating tool, such as a handle, is the same irrespective of the switchgear brand. Accordingly, this provides a magnificent freedom in the overall design of the motor operator as it is no longer dedicated to a special switchgear brand. A further advantage is that the motor operator is more maintenance friendly. In case of a fault it could swiftly be replaced with a new one.

It is understood that the interconnection between the coupling part and the connection shaft could be realized in various manners. Overall it should lock to the connection shaft to participate in the rotation of this.

A dog-socket connection is preferred, where the coupling part of the connection shaft could be slid axially on the coupling part of the switchgear. However, the socket could have an opening in the side for laterally receiving the dog. It is understood that the coupling part of the switch gear could be a dog and the coupling part of the connection shaft a socket or vise versa.

In an embodiment the connection is a spline connection, especially with fine mating longitudinal V-shaped ribs distributed around the mating surfaces of the spline connection with an angle of 6° or about 6°. This safeguards that a connection with the switchgear easily could be established in a manner such that the motor operator takes an upright position or any other desired position.

In a preferred embodiment of the invention, a release mechanism is build into the actuator decoupling the activation element from the motor and transmission, thereby allowing the activation element to be moved manually. Accordingly, when activating the release mechanism, it is without further notice possible to operate the switchgear manually, e.g., by means of a wrench. The release mechanism also possesses the inherit characteristic that even in case the motor unintentionally is operated, it is still unable to operate the switchgear. This release mechanism could also be deployed to test the drive mechanism of the actuator to see if it works properly.

According to an embodiment the activation knob of the motor operator is identical to the coupling part on the switchgear such that the dedicated tool for the coupling part could be used for manually operating of the switchgear through the motor operater.

Accordingly, it would be understood that the overall size of the motor operator could be relatively compact and may be readily mounted also as a retrofit unit on the external side of an existing switchgear cabinet.

DETAILED DESCRIPTION OF THE DRAWING

Figure 1:
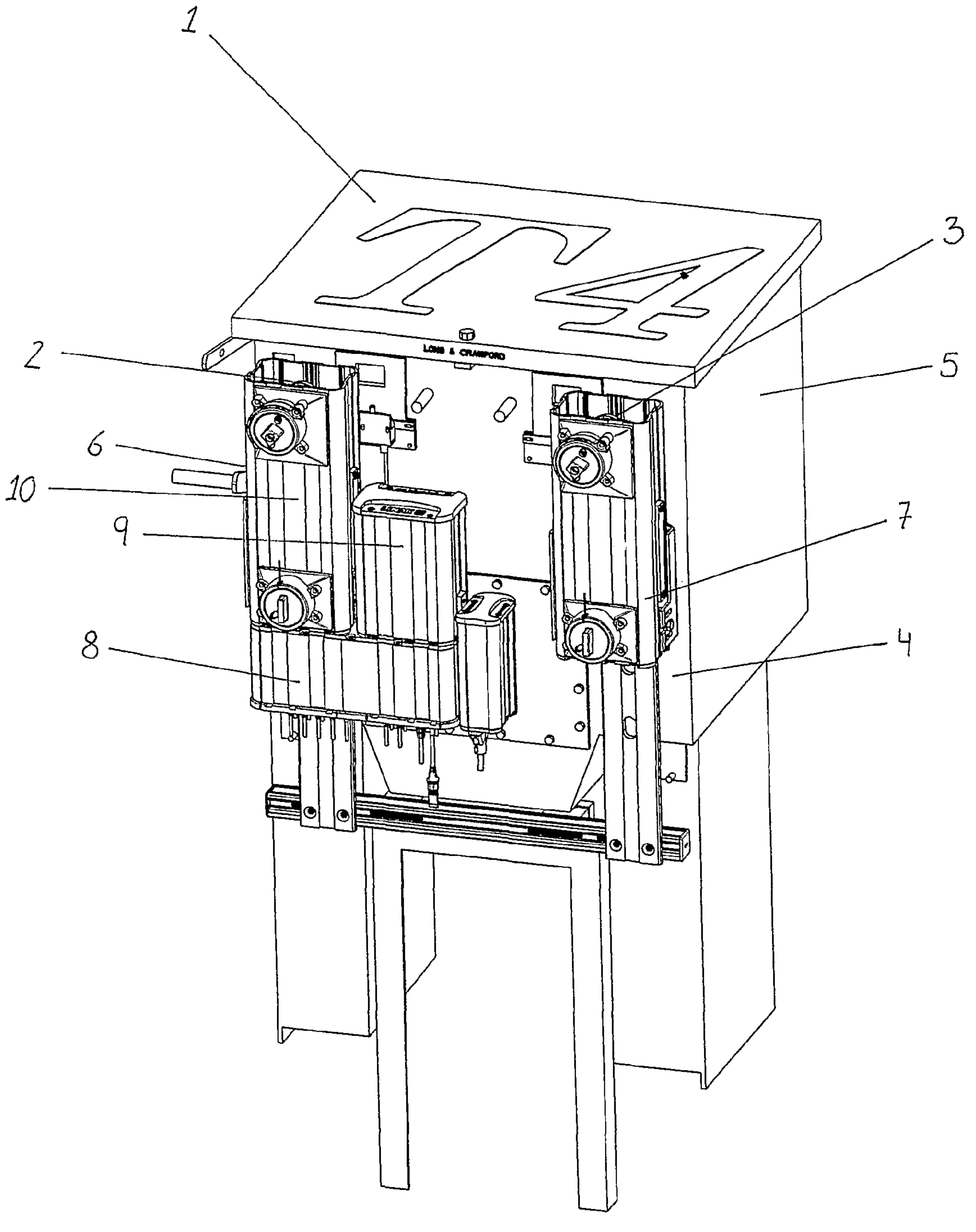
FIG. 1 is a perspective view of a switchgear seen from the front.

In FIG. 1 is shown a switchgear 1 with two sets of electric contacts operated by a rotary shaft ending in a dog 2,3 as a coupling part at the front side 4 of the cabinet 5 of the switchgear. The electric contacts are controlled by respective motor operators 6,7. The motor operator 6 on the left hand side of the switchgear is built together with a control unit 8 and a rechargeable battery package 9, which is common for the two motor operators.

The motor operator 6 comprises a housing 10 in the nature of an extruded aluminum profile with end closures, not shown. In the housing 10 is located a linear actuator 11 for operating the switchgear. The actuator is of the type comprising a reversible electric motor driving a spindle via a transmission. An activation element 12, in the nature of a tubular piston, is attached to a spindle nut traveling on the spindle. The activation element 12 is telescopically guided in a guide tube 13. The actuator has a rear mounting for mounting in the housing 10 of the motor operator, cf. FIGS. 2 and 3.

A connection shaft 14 is connected to the activation element 12 of the actuator by means of a lever arm 15. The connection shaft 14 has at its outer end an actuation knob 16 with a locking arrangement comprising a front part 17 of the actuation knob 16 with a hole, and a body 18 of the actuation knob has a corresponding adjacent wall element 18*a* with a similar hole. When a pad-lock is inserted into the hole in the wall element 18*a* and through the hole in the front part 17, the actuation knob 16 is locked and thereby prevents the switchgear from being operated.

For the manual operation of the switchgear, the linear actuator 11 is furnished with a build-in quick release, releasing the activation element 12 from the motor and transmission, allowing the activation element 12 to be operated manually. The release mechanism can be operated by a turnable knob 19 on the front side of the housing 6. When turning the knob 19, the release mechanism is activated. A front part 20 of the knob 19 can, like the front part 17 of the activation knob 16, be locked with a pad-lock 21, for which purpose the knob 19 is having a hole in the front part 20. A body 22 for the knob has a similar neighbouring wall element 23 with a hole.

Figure 2:
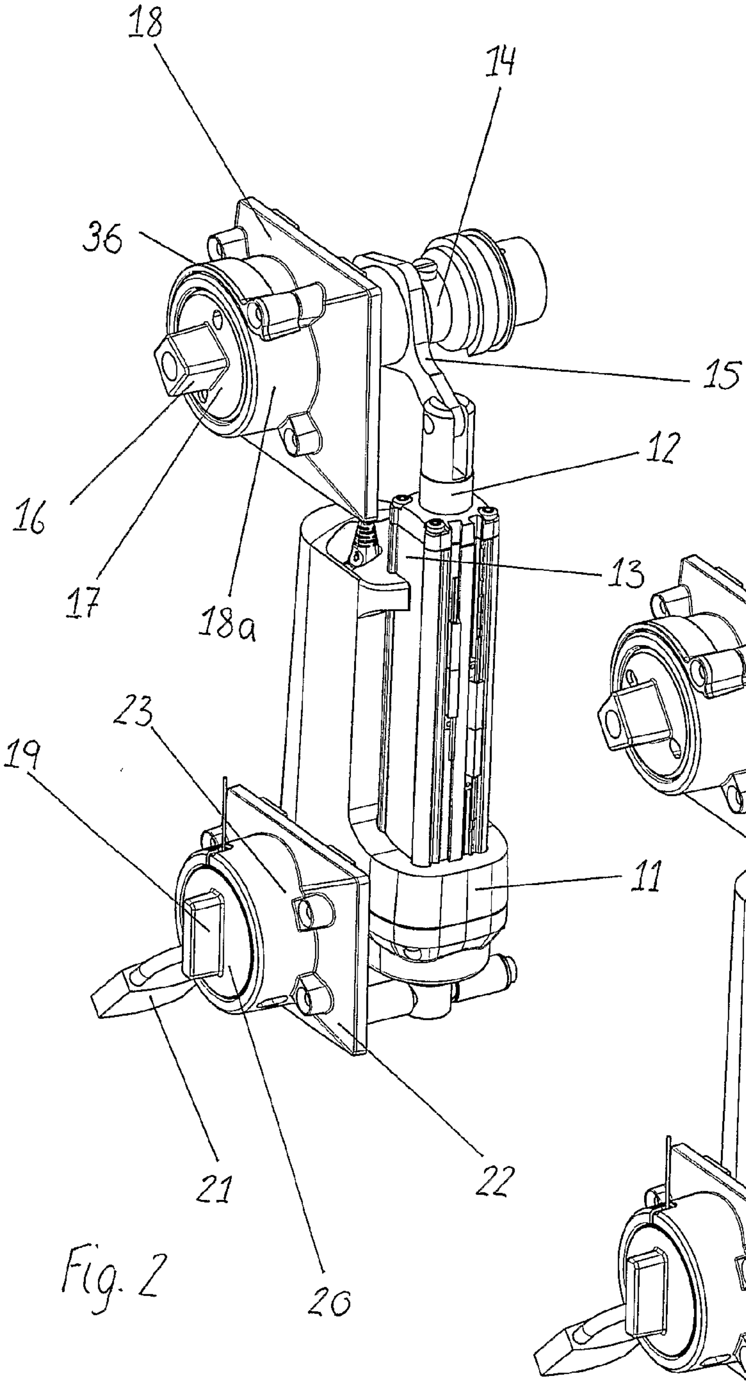
FIG. 2 is a phantom drawing of the motor operator.
Figure 3:
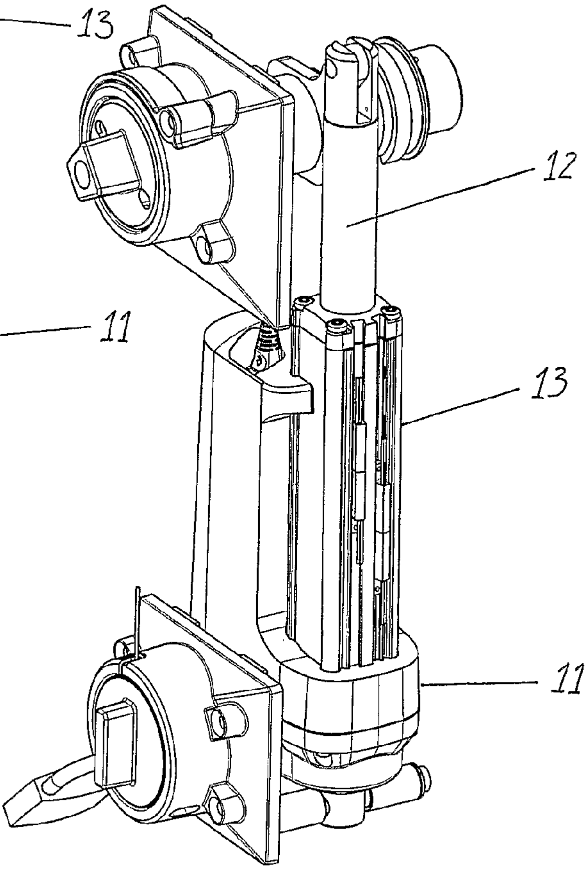
FIG. 3 is another phantom drawing of the motor operator.

FIG. 2 shows the situation where the actuation element 12 of the actuator 11 is in its retracted position corresponding to the contacts of the switchgear being in a closed position, i.e., on-position. Similarly, FIG. 3 shows the situation where the actuation element 12 of the actuator 11 is in an extended position corresponding to the contacts of the switchgear being in an open position, i.e., off-position, meaning that the distribution line in question is disconnected from the network.

Figure 4:
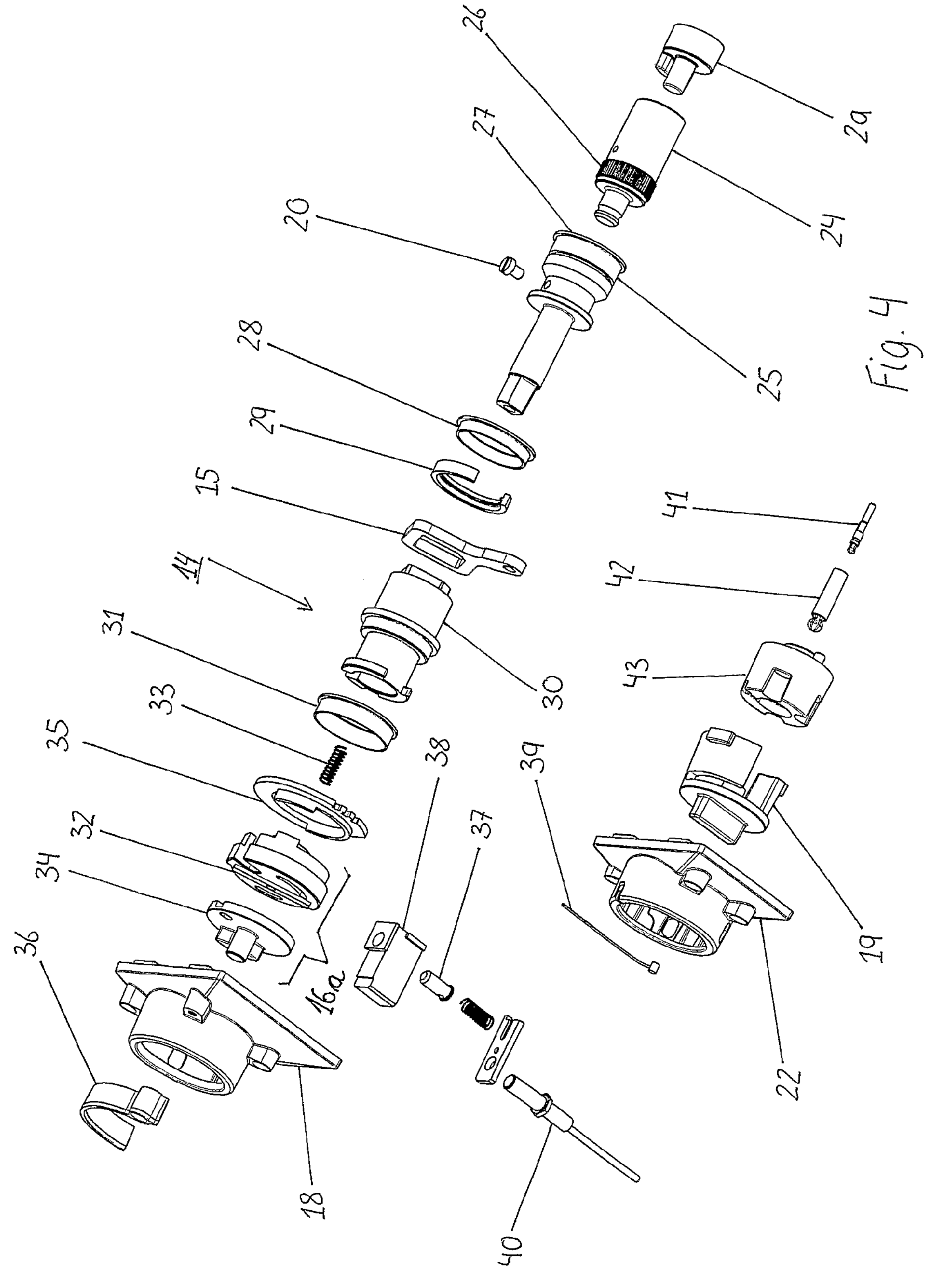
FIG. 4 is an exploded view of the linkage means for a system with a release function to feature earthing with the use of the actuation handle for changing the position of the switchgear.

An exploded view of a preferred embodiment is shown in FIG. 4, where the interaction between the coupling part for changing the switchgear and the release function of the actuator 11 can be explored, but with focus on interchangeable adapters. The dog 2*a* is the coupling part present on the switchgear on which an interchangeable socket (coupling part) 24 fits. The interchangeable socket 24 and the shaft 25 are connected by means of a spline connection having fine longitudinal V-shaped ribs distributed with intervals of 6°. One part of the spline connection is located on the surface of an end part 26 of the interchangeable socket 24 and the other part is located on an inner cavity 27 of the shaft 25. This spline connection with fine ribs ensures that the motor operator can be placed in a vertical position on the switchgear. Since the shaft 25 is formed to receive the interchangeable socket 24, the longitudinal V-shaped ribs are formed to ensure that the rotational forces applied to the shaft are transferred through the connection between the two parts. To fix the interchangeable socket 24 to the shaft 25, a screw 20 can be screwed into a hole in the shaft 25 to lock the two parts together. A slide bearing 28 receives the shaft 25 on the inner surface and fixes the connection shaft in its position in the motor operator housing 10. A lock ring 29 serves to snap on the shaft and forms a stop to keep the shaft 25 in its position in the slide bearing 28. As can be seen on the drawing, a circumferential groove is made on the outer surface of the shaft 25 on the end pointing towards the interchangeable socket 24 and a matching rib is made on the inner surface of the lock ring 29 in order to snap the two parts together.

The connection to the actuator, i.e., the rotary lever arm 15, fits perfectly to the square end portion of a rotary rod 30, the rotary rod being formed as a tube and positioned on the end of the shaft 25. A bearing 31 keeps the connection shaft together and forms a fixing means for fixing the entire connection shaft 14 in its position on the motor operator housing 10.

A base 32 of the actuation knob 16*a* couples the rotary rod 30 to the shaft 25. An end with a square cross section of the shaft 25 is received by a matching shape in the cavity of the base of the actuation knob 16*a*. The end of the shaft 25 is not fixed to the base 32 of the activation knob 16*a*, but has a limited freedom to move in the axis of the shaft. In a cavity of the base 32 of the actuation knob 16*a*, is also, in the relaxed position of the actuation knob 16*a*, a corresponding part that fits the end of the rotary rod 30. This means that the lever arm

15 is coupled directly to the actuation knob 16*a* when in the relaxed position. The actuation knob 16*a* is kept in its relaxed position by the spring 33. On the base 32 of the actuation knob 16*a* is mounted an interchangeable front part 34, fastened with a screw, that serves as an extrovert actuation part. The actuation knob 16*a* allows for manual operation of the switchgear with the use of a wrench like handle. Under the base 32 of the actuation knob 16*a* is placed a positioning and distance lock ring 35 that ensures that the base 32 cannot be pressed in its axial direction, when the handle is turned and held in positions to reflect positions in-between the switchgear's on and off positions, thus not releasing the base 32 of the actuation knob 16*a* from the rotary rod 30 in-between these positions. The body 31 of the activation knob 16*a* forms a guiding means for aligning the base 32. Mounting the pad-lock through the hole in the side wall of the body 18 of the actuation knob 16*a* connected via the hole in the front part 34 of the actuation knob and the corresponding free space in the side of the base 32, will make it possible to lock the switchgear in the positions, off and earth. A padlock cover 36 covers the holes when no pad-lock is mounted in order to protect against possible finger damage.

The present invention relates especially to a switchgear where the same physical wrench-like handle can be used to change the switchgear position, but also when the switchgear position is "off" to switch the earth coupling contacts, in order for the switchgear to be earthed, when the switchgear is again forced in the "on" position. To be able to switch the earth contacts, the actuator 11 has to be released from the connection shaft. This is done by pushing the actuation knob 16*a* and, in one operation, using the wrench like handle to manually couple the earthing contacts. Since a plunger 37 fitted in a sensor and plunger body 38 will prevent the activation knob 16*a* from being pushed, the release function, to be activated with the release knob 19 placed in the release body 22, has to be operated. This function both releases the gear and the motor from the spindle in the actuator 11, breaks the electrical connection to the motor in the actuator and, via a Bowden cable 39, retracts the plunger 37 against a spring into the sensor and plunger body 38. When the plunger 37 is retracted, the activation knob 16*a* can be pushed in and the earth switch can be operated. An inductive sensor 40 will sense that the activation knob 16*a* is pushed in and inform the control unit accordingly. The shaft parts 41, 42 are connected to the release mechanism of the actuator 11. A bushing 43 keeps the Bowden cable 39 in place on the release knob 19, when the release mechanism is in its initial position. The release function is not dedicated the manual switching of the earth switch, but the switchgear itself can also be operated manually, when the release function is activated.

Figure 5:
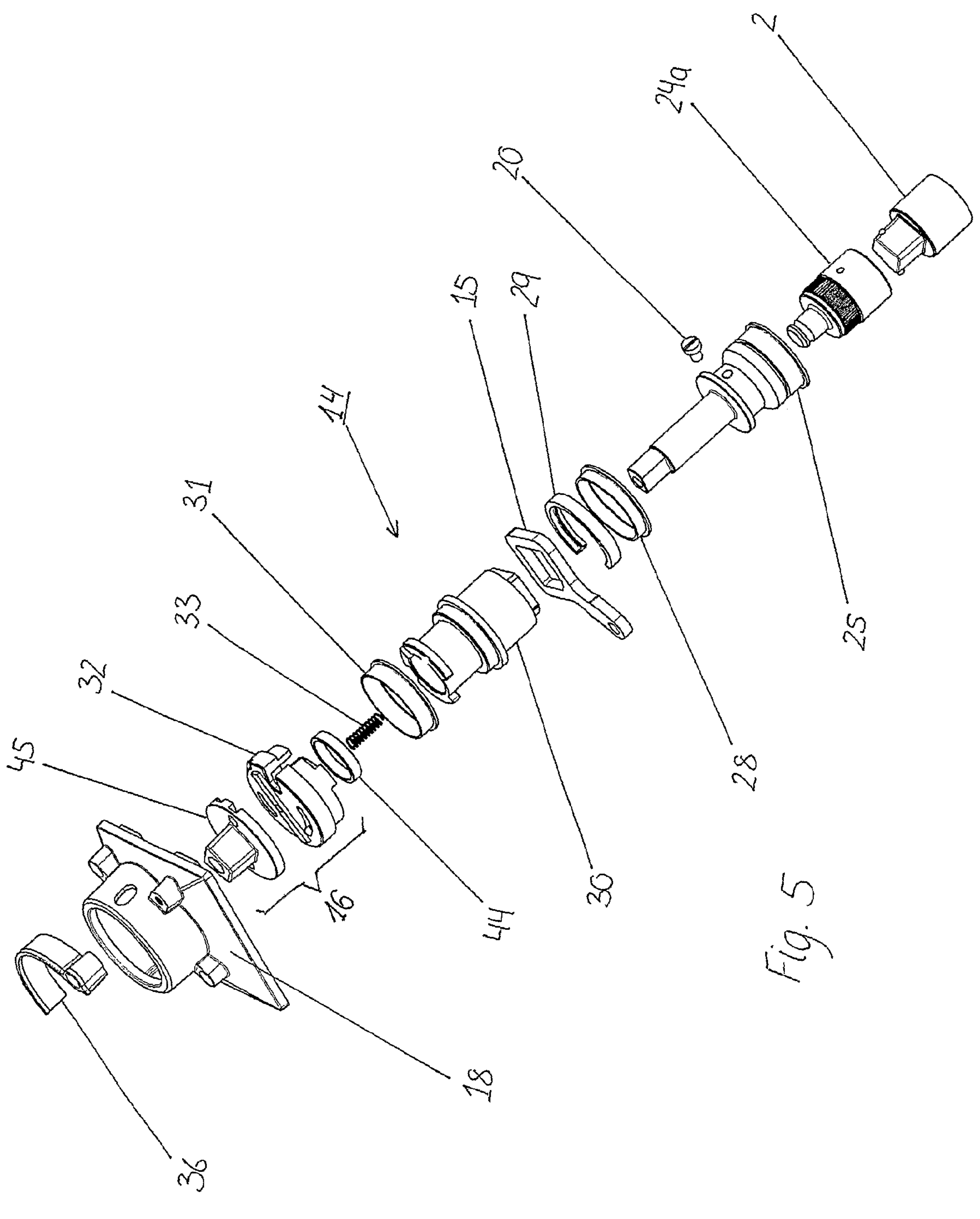
FIG. 5 is an exploded view of the linkage means for a system without earthing, reusing most of the parts but introducing new interchangeable adapters.
Figure 6:
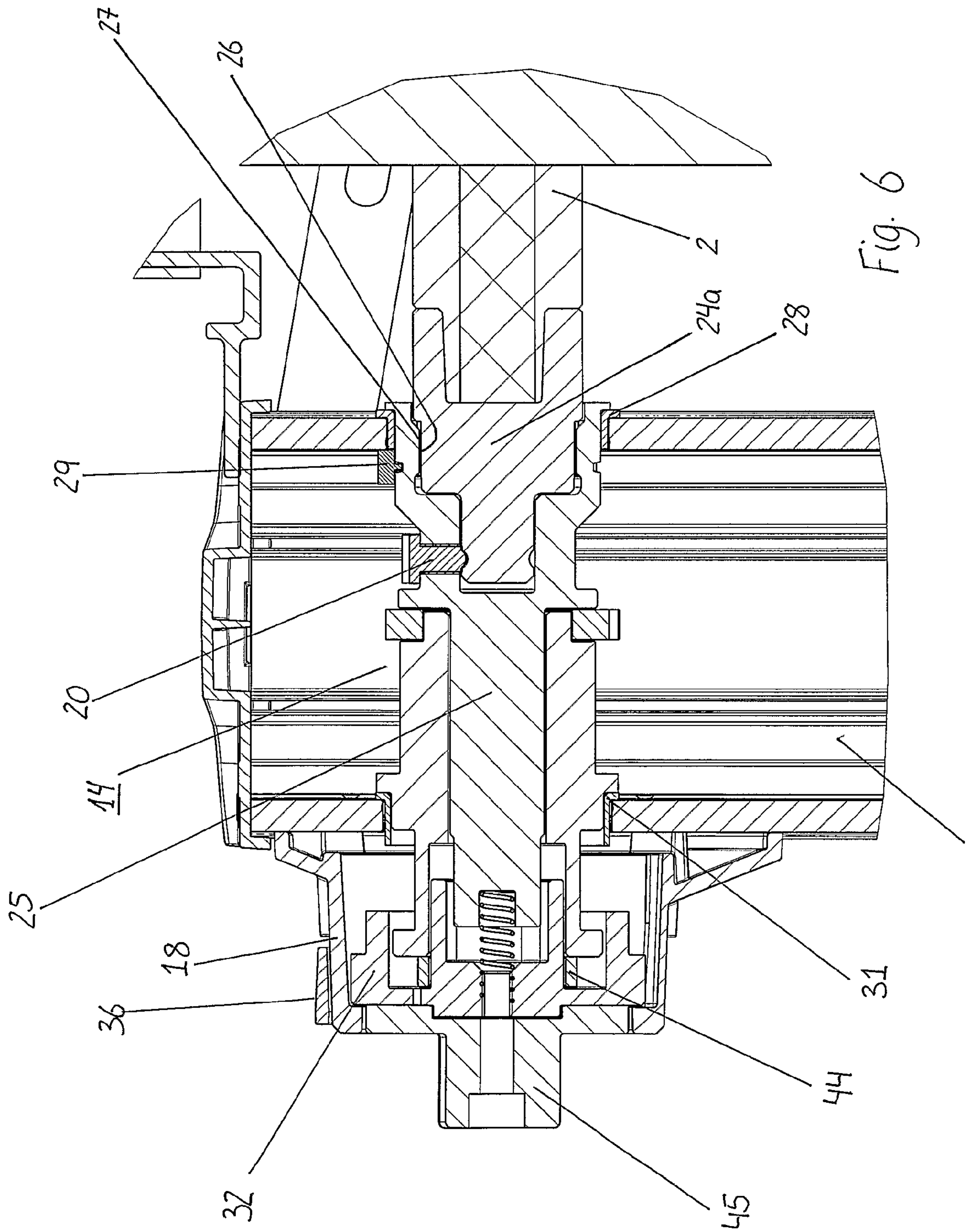
FIG. 6 is an enlarged cross section of the upper part of the motor operator, showing the connection to the operating shaft of the contacts of the switch gear.

A similar exploded view for the connection shaft 14, but without a release function, is pictured in FIG. 5. Please note that most of the parts described in FIG. 6 are identical. The shape of the coupling parts 2 and 2*a* is different corresponding to two different brands of switchgears. To fit the coupling part 2, a different interchangeable socket 24*a* is made. As with the interchangeable socket 24, it fits the shaft 25. Since the base 32 of the actuation knob do not, in this embodiment, support an earthing function, the base 32 cannot be pushed axially, thus a distance lock ring 44 is mounted to avoid this. To adapt to the topology of the present brand of switchgear, a front part 45 of the actuation knob 16 with a shape similar to the coupling part 2 on the switchgear is mounted. The release mechanism is, in this embodiment, not shown, but is used to release the actuator 11 as described in the previous embodiment. There will, however, be no coupling between the release function and the connection shaft 14.

The principle of the interchangeable adapter without a release function can be seen in FIG. 5, where the dog 2 of the switchgear is forwarded to the front of the housing of the motor operator to form a manual accessible actuation knob 16 on the front of the motor operator housing 10. Please note that the interchangeable socket 24, 24*a* could be tailored to fit different types and brands of switchgears. At the upper end of the housing 10 of the motor operator, a connection shaft 14 is arranged. The interchangeable socket 24 is receiving the coupling part or dog 2 on the switchgear, and is received by the shaft 25 and locked with the screw 20. Since the shaft 25 in its receiving cavity is furnished with one part of a spline connection and the interchangeable socket 24*a* on its outside is furnished with the other part of the spline connection, the parts fit closely together and transfer the rotating forces. In the other end of the connection shaft, the shaft 25 is connected to the base 32 of the actuation knob 16. The end of the shaft 25 fits a cavity in the base 32 of the actuation knob, but has the freedom to move in the axial direction. This freedom is limited because of the distance lock ring 44 so that the activation knob 16 cannot be pushed axially. The front part 45 of the actuation knob 16 is mounted on the base 32 of the actuation knob and secured with a screw, not shown. The connection shaft 14 is journaled in the bearings 28 and 31. The lock ring 29 locks the rotary rod 25 in the position in the bearings of the housing 10.

It is understood that the interconnection between the coupling part and the connection shaft could be realized in various manners. Overall it should lock to the connection shaft to participate in the rotation of this. Further, it is understood that the coupling part of the connection shaft could be a dog member instead of a socket.

The invention claimed is:

1. A motor operator for use with a switchgear of a mains power distribution system, said switchgear including a cabinet having a first coupling part extending from a front side thereof, said motor operator comprising:

a housing which is mountable on the front side of the cabinet, a rectilinear connection assembly which extends from the first coupling part of the switchgear cabinet to an actuation knob at a front face of the housing, said connection assembly comprising a shaft element, an elongated second coupling part which has a first end that is interlockable with the first coupling part of the switchgear cabinet and a second end which can be connected to a first end of said shaft element, and interlocking means to detachably interconnect said second end of said elongated coupling part with said first end of said shaft element, and a motor-driven drive mechanism connected to said connection assembly to rotate said connection assembly and said first coupling part so as to either electrically connect or electrically disconnect said switch-gear with said mains power distribution system.

2. The motor operator according to claim 1, wherein said elongated second coupling part comprises a socket, and wherein said interlocking means comprises ribs at a second end of said socket that mate with ribs at said first end of said shaft.

3. The motor operator according to claim 1, wherein said motor-driven drive mechanism comprises a linear actuator.

4. The motor operator according to claim 3, wherein said connection assembly includes a lever arm and said linear actuator includes a housing and an activation element that is connected to said lever arm so that extension or retraction of said activation element relative to said housing will rotate said connection assembly.

* * * * *